United States Patent
Ye et al.

(10) Patent No.: US 9,628,130 B2
(45) Date of Patent: *Apr. 18, 2017

(54) MULTIFUNCTIONAL PROTECTIVE CASE WITH WIRELESS ROUTER FUNCTIONALITY

(71) Applicant: Huizhou TCL Mobile Communication Co., Ltd, Huizhou, Guangdong (CN)

(72) Inventors: Wenyi Ye, Guangdong (CN); Wenliang Lu, Guangdong (CN); Junhao Yuan, Guangdong (CN); Wei Ma, Guangdong (CN); Xuelong Ronald Hu, Guangdong (CN); Vittorio Di Mauro, Guangdong (CN)

(73) Assignee: Huizhou TCL Mobile Communication Co., Ltd, Huizhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/706,483

(22) Filed: May 7, 2015

(65) Prior Publication Data
US 2016/0142092 A1    May 19, 2016

(30) Foreign Application Priority Data
Nov. 18, 2014  (CN) .......................... 2014 1 0660292

(51) Int. Cl.
*H04M 1/00* (2006.01)
*H04B 1/3888* (2015.01)
(Continued)

(52) U.S. Cl.
CPC ......... *H04B 1/3888* (2013.01); *G06F 1/1626* (2013.01); *H04B 1/3877* (2013.01); *H04M 1/72575* (2013.01); *G06F 2200/1634* (2013.01)

(58) Field of Classification Search
CPC .. H04B 1/3888; H04B 1/3877; H04B 1/3838; H04B 7/15535; A45C 2011/002;
(Continued)

(56) References Cited

U.S. PATENT DOCUMENTS 8,599,542 B1 * 12/2013 Healey .................. G06F 1/1626
                                                       345/168
8,807,333 B1 *  8/2014 Cooper .................. A45C 11/00
                                                       206/320

(Continued)

FOREIGN PATENT DOCUMENTS

CN    202058075 U    11/2011
CN    202661932 U    1/2013

*Primary Examiner* — Babar Sarwar
(74) *Attorney, Agent, or Firm* — Klein, O'Neill & Singh, LLP

(57) ABSTRACT

A multifunctional protective case for a tablet computer includes a front plate (110) with a sandwich structure (111), a holding plate configured to hold a back of the tablet computer and a supporting plate (130) connecting the front plate (110) and the holding plate (120) via a bendable portion (140) to support the tablet computer. A printed circuit board (112) with wireless router functionality is installed in the sandwich structure (111) in the front plate (110), therefore enabling the protective case with wireless router functionality. The printed circuit board (112) can be connected with an external wireless network card, and the tablet computer can get access to a cellular network once placed in the multifunctional protective case and connected to the printed circuit board.

18 Claims, 2 Drawing Sheets

(51) Int. Cl.
*G06F 1/16* (2006.01)
*H04B 1/3877* (2015.01)
*H04M 1/725* (2006.01)

(58) Field of Classification Search
CPC ............ A45C 2011/003; G06F 1/1626; G06F 1/3231; G06F 1/325; G06F 2200/1634; H01Q 1/243; H01Q 1/245; H04M 1/72575
USPC .. 455/566, 575.1, 575.3, 575.8, 90.3, 550.1, 455/41.1, 41.2, 552.1, 420
See application file for complete search history.

(56) References Cited

U.S. PATENT DOCUMENTS

| | | | | |
|---|---|---|---|---|
| D752,593 S | * | 3/2016 | Diebel | G06F 1/1628 D14/440 |
| 2011/0297581 A1 | * | 12/2011 | Angel | F16M 13/04 206/736 |
| 2012/0037285 A1 | * | 2/2012 | Diebel | A45C 11/00 150/165 |
| 2012/0044638 A1 | | 2/2012 | Mongan et al. | |
| 2012/0088557 A1 | * | 4/2012 | Liang | G06F 1/1628 455/575.1 |
| 2012/0268891 A1 | * | 10/2012 | Cencioni | G06F 1/1626 361/679.55 |
| 2013/0016467 A1 | | 1/2013 | Ku | |
| 2013/0178161 A1 | * | 7/2013 | Shulenberger | G06F 1/162 455/41.2 |
| 2013/0277271 A1 | * | 10/2013 | Toulotte | A45C 11/00 206/752 |
| 2014/0043741 A1 | * | 2/2014 | Smith | G06F 1/16 361/679.3 |
| 2014/0151248 A1 | | 6/2014 | Hurst et al. | |
| 2014/0209503 A1 | * | 7/2014 | Angel | A45C 11/00 206/736 |
| 2014/0216954 A1 | * | 8/2014 | Law | A45F 5/02 206/45.23 |
| 2014/0247548 A1 | | 9/2014 | Sharma et al. | |
| 2014/0291172 A1 | * | 10/2014 | Rogers | A45C 11/00 206/37 |
| 2014/0341197 A1 | | 11/2014 | Hong et al. | |
| 2015/0065208 A1 | * | 3/2015 | Balaji | H04M 1/04 455/575.8 |

* cited by examiner

MULTIFUNCTIONAL PROTECTIVE CASE WITH WIRELESS ROUTER FUNCTIONALITY

CROSS-REFERENCE TO RELATED APPLICATIONS

This application claims all benefits accruing under 35 U.S.C. §119 from China Patent Application No. 201410660292.1, filed on Nov. 18, 2014 in the China Intellectual Property Office, the disclosure of which is incorporated herein by reference. This application is related to a commonly-assigned Application entitled, "A Protective Case for a Tablet Computer" filed concurrently, application Ser. No. 14/706,413.

FIELD

The present disclosure herein generally relates to an electronic device package field, more specifically, relates to a multifunctional protective case for a tablet computer.

BACKGROUND

At present, customers with an iPad or such a tablet computer expect to surf the Internet and shop on line whenever and wherever possible, however, a portion of the existing tablets don't have cellular support, while the tablets with cellular support are relatively more expensive. In terms of the customers that have purchased a tablet without cellular support, it is anyway inconvenient to carry a wireless router along when they are out of home, and the router is likely to get lost. Meanwhile, many customers who have purchased a tablet would in addition buy a protective case, in order to protect their tablets from being scratched or damaged.

BRIEF DESCRIPTION OF THE DRAWINGS

Implementations of the present technology will now be described, by way of example only, with reference to the attached figures, wherein.

DETAILED DESCRIPTION

Figure 1:
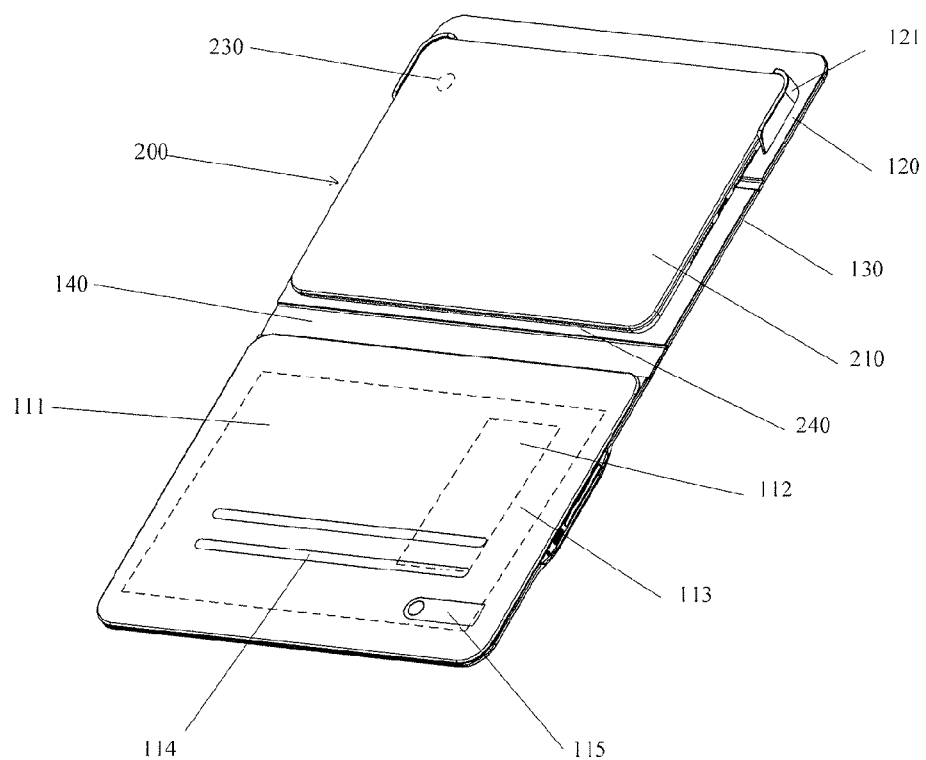
FIG. 1 is a schematic diagram of one embodiment of a multifunctional protective case for a tablet computer when it is unfolded.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Several definitions that apply throughout this disclosure will now be presented.

The term "outside" refers to a region that is beyond the outermost confines of a physical object. The term "inside" indicates that at least a portion of a region is partially contained within a boundary formed by the object. The term "comprising," when utilized, means "including, but not necessarily limited to"; it specifically indicates open-ended inclusion or membership in the so-described combination, group, series and the like.

The present disclosure is described in relation to a multifunctional protective case for a tablet computer.

Figure 2:
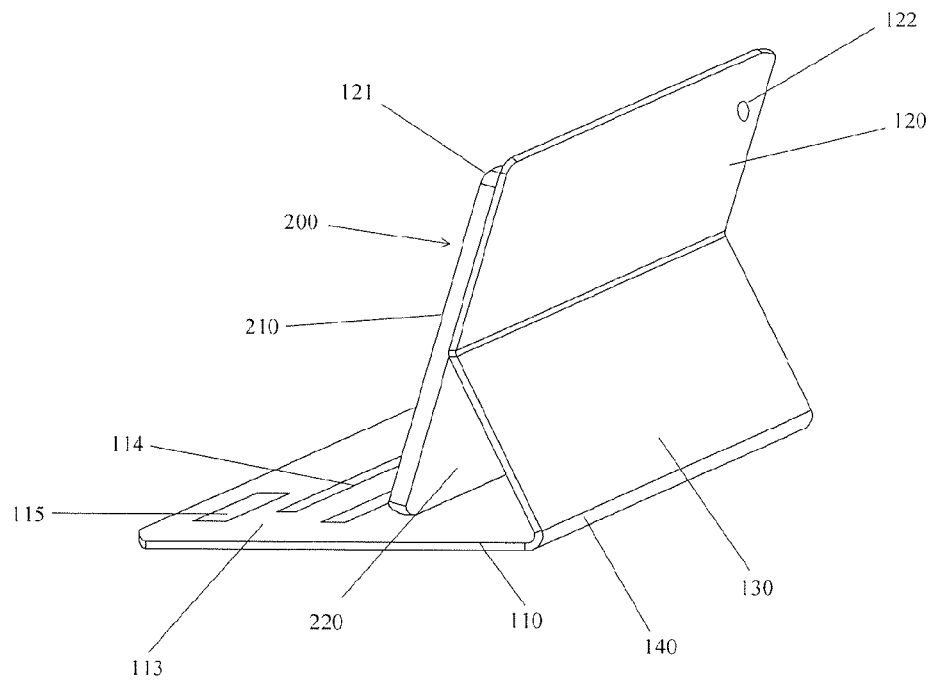
FIG. 2 is a schematic diagram of one embodiment of the multifunctional protective case when it is used to support the tablet computer.

FIG. 1 is a schematic diagram of one embodiment of a multifunctional protective case for a tablet computer when the case is unfolded; FIG. 2 is a schematic diagram of one embodiment of the multifunctional protective case when the case is used to prop up the tablet computer.

Referring to FIG. 1 and FIG. 2, the multifunctional protective case is adapted for a tablet computer 200. The tablet computer 200 comprises a display surface 210, a back surface 220 opposite to the display surface 210, and a camera 230 installed in the tablet computer 200 on the back surface 220. The tablet computer 200 comprises four peripheral sides. Every two opposite sides are parallel to each other. One of the four peripheral sides is defined as a bottom end 240 comprising a permanent magnet or a ferromagnetic element.

The protective case comprises a front plate 110 to protect a display surface 210 of the tablet computer 200, a holding plate 120 configured to hold a back of the tablet computer 200, and a supporting plate 130 connecting the front plate 110 and the holding plate 120 via a bendable portion 140 to prop up the tablet computer 200. The front plate 110 comprises a sandwich structure 111 having a printed circuit board 112 with wireless router functionality. Each of the front plate 110, the holding plate 120, the supporting plate 130 and the bendable portion 140 has a rectangular configuration and a same length along an extending direction of the bottom end 240 of the tablet computer 200.

The printed circuit board 112 with router functionality is installed in the sandwich structure 111, and it can be used cooperatively with an external wireless network card. When the wireless network card is connected to the printed circuit board 112, the tablet computer 200 only needs to be placed in the multifunctional protective case and connected to the printed circuit board 112 further to get access to a cellular network.

The front plate 110 comprises a first surface 113, wherein the sandwich structure 111 is located in the front plate 110 beneath the first surface 113. At least one magnetic element 114 is embedded in the front plate 110. When the tablet computer 200 is not in use, the front plate 110 can protect the tablet computer 200; when the tablet computer 200 is in use, the bottom end 240 of the tablet computer 200 stands up on the top surface 113, the front plate 110 can support the bottom end 240 of the tablet computer 200.

The at least one magnetic element 114 comprises a plurality of parallel magnetic protrusions, wherein the at least one magnetic element 114 according to one embodiment of the multifunctional protective case is two parallel magnetic protrusions which are embedded in the front plate 110. Top surfaces of the two magnetic protrusions are coplanar with the first surface 113. The at least one magnetic element 114 can be a first permanent magnet corresponding to the permanent magnet or the ferromagnetic element of the tablet computer 200. A magnetic pole of the first permanent magnet facing the bottom end 240 is opposite to the magnetic pole of the permanent magnet or the ferromagnetic element in the bottom end 240 facing the first surface 113. The bottom end 240 of the tablet computer 200 can be secured on different positions on the first surface 113 by the attraction between the permanent magnet or the ferromagnetic element installed in the bottom end 240 and each of the at least one magnetic element 114 respectively.

The holding plate 120 comprises a first holding element 121. The first holding element 121 holds the back of the tablet computer 200 by a latch mechanism. In one embodiment, the holding element 121 comprises a pair of latches for clapping the pairs of adjacent peripheral corners which are far away from the bottom end 240. In this way, when the protective case is unfolded to prop up the tablet computer 200, the magnetic element 114 is capable of attracting the bottom end 240 of the tablet computer 200 by the permanent magnet or the ferromagnetic element installed therein, and the holding element 121 on the holding plate 120 can secure the back of the tablet computer 200, thus preventing the tablet computer 200 from slipping out of the protective case.

A first hole 122 is defined in the holding plate 120 near the first holding element 121. The first hole 122 is in accordance with the camera of the tablet computer 200 in position. The tablet computer 200 can be used not only to get online, but also to shoot a photograph or a video. Thus the installation of the first hole 122 facilitates the shooting for the tablet computer 200 when it is used as a camera that the protective case needs not to be taken off.

Figure 3:
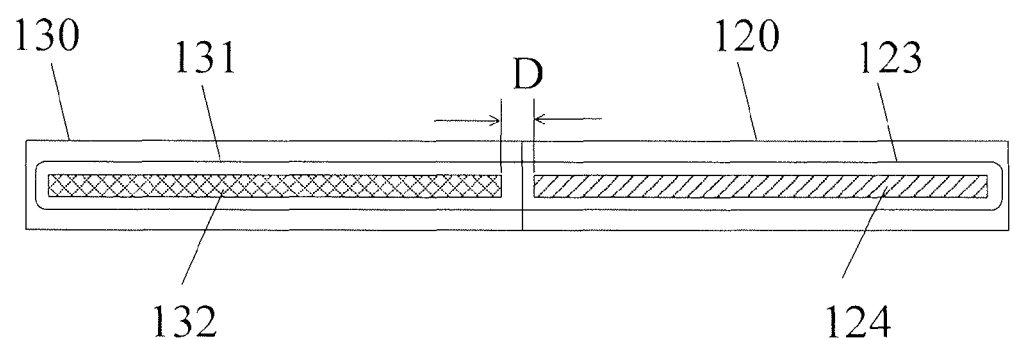
FIG. 3 is a cross sectional view of a holding plate and a supporting plate of one embodiment of the multifunctional protective case when the plates are unfolded.

The holding plate 120 comprises a first coating layer 123 and a first plate 124 enclosed in the first coating layer 123, and the supporting plate 130 comprises a second coating layer 131 and a second plate 132 enclosed in the second coating layer 131. The first coating layer 123 and the second coating layer 131 are connected with each other to be an integrity, and a gap D is determined between the first plate 124 and the second plate 132. The gap D is generally 6 mm in width as illustrated in FIG. 3, wherein the gap D has the same width as that of the bendable portion 140. The gap D is provided to adapt to the varying angular bending between the holding plate 120 and the supporting plate 130, thus enabling the tablet computer 200 to stand at different angles. In this embodiment, the first coating layer 123 and the second coating layer 131 are made of PU leather, and the first plate 124 and the second plate 132 are made of PC plate material, however, the materials are not intended to be limiting, any other material with similar properties can also be applied.

PU is the abbreviation of polyurethane, and PU leather stands for the leather containing polyurethane constituents. PU leather has broad applications in luggage, clothing, furniture and many other territories for its outstanding abrasive resistance, breathability and ageing resistance together with its strong flexibility and soft and comfortable texture. Wherein the PU leather being applied to the material of the first coating layer 123 and the second coating layer 131, its abrasive resistance, softness and other excellent properties can meet the material requirements of the multifunctional protective case for the tablet computer. Meanwhile, PC is short for polycarbonate, and polycarbonate is the major constituents of PC plates. The PC plates are sheet material made by thermal forming technologies, and have extensive applications in for instance, package and other territories for its light weight and good mechanical properties.

A display window 115 is arranged on the first surface 113 near the at least one magnetic element 114 to display a battery status of the tablet computer 200.

The first surface 113 is made of a soft material. The first surface 113 is the surface adhering to the display surface 210 of the tablet computer 200, thus protecting the tablet computer 200 when the protective case is closed. The application of a soft material to the first surface 113 can protect the display surface 210 of the tablet computer 200, therefore protecting the display surface 210 form being scratched.

In one embodiment according to the present disclosure, the printed circuit board 112 with router functionality is installed in the sandwich structure 111 in the front plate 110, thus it is able to satisfy the performance requirements for cellular network functionality for the tablet computers without cellular support. The above multifunctional protective case successfully resolves the conflict between customers' needs with tablets to get access to a cellular network and the high prices of the tablets with cellular support.

It should be noted that above embodiments are merely exemplary ones of the present invention. Obviously, the present invention is not limited to above embodiments, but has many variations. All variations that a person skilled in the art derives from or directly reaches form the contents disclosed in the present invention shall be considered as falling into the protective scope of the present invention.

What is claimed is:

1. A multifunctional protective case for a tablet computer, comprising:
a front plate adapted to protect a display surface of the tablet computer and support and contact a bottom wall of the tablet computer when the tablet computer stands up, and comprising a sandwich structure, the sandwich structure comprising a printed circuit board with router functionality, wherein parallel magnetic elements are installed in the front plate;
a holding plate configured to hold a back of the tablet computer;
a supporting plate connecting the front plate and the holding plate to support the tablet computer;
wherein the parallel magnetic elements are attracted to a corresponding magnetic element of the bottom wall of the tablet computer to enable the tablet computer to stand up at different angles;
wherein the holding plate comprises a first coating layer and a first plate enclosed in the first coating layer, and the supporting plate comprises a second coating layer and a second plate enclosed in the second coating layer; and
wherein the first coating layer and the second coating layer are connected with each other, and a gap is defined between the first plate and the second plate.

2. The multifunctional protective case as claimed in claim 1, wherein the front plate comprises a first surface to contact with the display surface of the tablet computer when the tablet computer lays, the magnetic element is arranged on the first surface.

3. The multifunctional protective case as claimed in claim 2, wherein the parallel magnetic elements are parallel magnetic protrusions.

4. The multifunctional protective case as claimed in claim 3, wherein the magnetic element in the front plate comprises a first permanent magnet, and a second permanent magnet is installed on one bottom end of the tablet computer corresponding to the first permanent magnet; wherein a magnetic pole of the first permanent magnet facing the bottom end of the tablet computer is opposite to the magnet pole of the second permanent magnet facing the first surface.

5. The multifunctional protective case as claimed in claim 2, wherein a display window is arranged on the first surface near the magnetic element to display a battery status of the tablet computer.

6. The protective case as claimed in claim 5, wherein the first coating layer and the second coating layer comprise polyurethane material, and the first plate and the second plate comprise polycarbonate sheet material.

7. The multifunctional protective case as claimed in claim 1, wherein the first coating layer and the second coating layer comprise polyurethane material, and the first plate and the second plate comprise polycarbonate sheet material.

8. The multifunctional protective case as claimed in claim 1, wherein the holding plate comprises a first holding element; wherein the first holding element holds the back of the tablet computer by a latch mechanism.

9. The multifunctional protective case as claimed claim 8, wherein a first hole is defined in the holding plate near the first holding element; wherein the first hole is in accordance with a camera of the tablet computer in position.

10. A multifunctional protective case for a tablet computer, comprising:
    a front plate configured to support and contact with a bottom end of the tablet computer when the tablet computer stands up, the front plate comprising a sandwich structure and a plurality of magnetic elements installed in the front plate, wherein the sandwich structure comprises a printed circuit board with wireless router functionality, the bottom end of the tablet computer comprises a permanent magnet which is attracted with one of the magnetic elements to enable the tablet computer to stand up at different angles;
    a holding plate configured to be attached to an upper portion of a back of the tablet computer; and
    a supporting plate connecting the front plate and the holding plate and spaced from a lower portion of the back of the tablet computer;
    wherein the holding plate comprises a first coating layer and a first plate enclosed in the first coating layer, and the supporting plate comprises a second coating layer and a second plate enclosed in the second coating layer; and
    wherein the first coating layer and the second coating layer are connected with each other and a gap is defined between the first plate and the second plate.

11. The multifunctional protective case as claimed in claim 10, wherein the front plate comprises a top surface and the bottom end of the tablet computer is located on the top surface; the magnetic elements are embedded in the front plate, and top surfaces of the magnetic elements are coplanar with the top surface of the front plate.

12. The multifunctional protective case as claimed in claim 10, wherein the magnetic elements are elongated protrusions which are parallel to each other, and each of the magnetic elements has a configuration corresponding to that of the bottom end of the tablet computer.

13. The multifunctional protective case as claimed in claim 10, wherein a magnetic pole of each of the magnetic elements facing the bottom end of the tablet computer is opposite to that of the permanent magnet at the bottom end of the tablet computer facing the front plate.

14. The multifunctional protective case as claimed in claim 10, wherein a display window is defined in the holding plate to display the battery status of the tablet computer.

15. The multifunctional protective case as claimed in claim 10, wherein a bendable portion is located between the holding plate and the supporting plate.

16. The multifunctional protective case as claimed in claim 15, wherein the first and second coating layers comprise polyurethane material and the first and second plate comprise polycarbonate material.

17. The multifunctional protective case as claimed in claim 10, wherein the gap has a same width as that of the bendable portion.

18. The multifunctional protective case as claimed in claim 10, wherein an external wireless network card is connected to the printed circuit board, and the printed circuit board is connected to the tablet computer, whereby the tablet computer is able to get access to a cellular network.

* * * * *